(12) United States Patent
Liu et al.

(10) Patent No.: US 11,068,884 B2
(45) Date of Patent: Jul. 20, 2021

(54) E-WALLET TRANSFER PAYMENT METHOD AND SYSTEM BASED ON PKI SMART CARD

(71) Applicant: HIERSTAR (SUZHOU)., LTD., Jiangsu (CN)

(72) Inventors: Guo Liu, Jiangsu (CN); Zheng Zhang, Jiangsu (CN); Wenbin Bao, Jiangsu (CN)

(73) Assignee: HIERSTAR (SUZHOU)., LTD., Suzhou (CN)

( * ) Notice: Subject to any disclaimer, the term of this patent is extended or adjusted under 35 U.S.C. 154(b) by 0 days.

(21) Appl. No.: 16/900,365

(22) Filed: Jun. 12, 2020

(65) Prior Publication Data

US 2020/0311719 A1 Oct. 1, 2020

Related U.S. Application Data

(63) Continuation-in-part of application No. 15/532,824, filed as application No. PCT/CN2015/091914 on Oct. 14, 2015, now abandoned.

(30) Foreign Application Priority Data

Dec. 4, 2014 (CN) .......................... 201410736624.X

(51) Int. Cl.
*G06Q 20/36* (2012.01)
*G06Q 20/34* (2012.01)
(Continued)

(52) U.S. Cl.
CPC ....... *G06Q 20/3674* (2013.01); *G06Q 20/341* (2013.01); *G06Q 20/352* (2013.01);
(Continued)

(58) Field of Classification Search
None
See application file for complete search history.

(56) References Cited

U.S. PATENT DOCUMENTS

| 2007/0255653 A1 | 11/2007 | Tumminaro |
| 2010/0077222 A1 | 3/2010 | Scherzer |
| 2019/0034921 A1 | 1/2019 | Hammad |

FOREIGN PATENT DOCUMENTS

| CN | 1418351 | 5/2003 |
| CN | 102568113 | 7/2012 |
| | (Continued) | |

OTHER PUBLICATIONS

International search report dated Jan. 20, 2016 from corresponding application No. PCT/CN2015/091914.

*Primary Examiner* — Joseph W. King
(74) *Attorney, Agent, or Firm* — Hauptman Ham, LLP

(57) ABSTRACT

An E-wallet transfer payment method includes: connecting a first PKI smart card to a second PKI smart card wirelessly; the first PKI smart card receiving a transfer instruction input by a first user, wherein the transfer instruction comprises a transfer amount to be transferred to a payee account; the second PKI smart card sending the payee account information to the first PKI smart card; the first PKI smart card generating transaction information according to the transfer instruction, and displaying the transaction information; the first PKI smart card receiving a confirmation instruction input by the first user according to the displayed transaction information; the first PKI smart card deducting a corresponding amount in a payment account according to the transfer amount, generating a signature information and sending the signature information to the second PKI smart card; adding the corresponding amount to the payee account according to the signature information.

20 Claims, 4 Drawing Sheets

(51) Int. Cl.
    *G06Q 20/38*     (2012.01)
    *G06Q 20/40*     (2012.01)
    *G06Q 20/42*     (2012.01)
    *H04L 9/00*     (2006.01)
    *H04L 9/32*     (2006.01)
    *G06Q 40/02*     (2012.01)

(52) U.S. Cl.
    CPC ..... *G06Q 20/3676* (2013.01); *G06Q 20/3825* (2013.01); *G06Q 20/3829* (2013.01); *G06Q 20/401* (2013.01); *G06Q 20/42* (2013.01); *G06Q 40/02* (2013.01); *H04L 9/006* (2013.01); *H04L 9/3234* (2013.01); *G06Q 2220/00* (2013.01)

(56) References Cited

FOREIGN PATENT DOCUMENTS

| | | |
|---|---|---|
| CN | 103150812 | 6/2013 |
| CN | 103426084 | 12/2013 |
| CN | 104376455 | 2/2015 |
| WO | WO2014040717 | 3/2014 |

E-WALLET TRANSFER PAYMENT METHOD AND SYSTEM BASED ON PKI SMART CARD

PRIORITY CLAIM

This is a continuation-in-part application of U.S. patent application Ser. No. 15/532,824, filed on Jul. 6, 2017, and claims priority to the National Stage of International Application No. PCT/CN2015/091914, filed on Oct. 14, 2015, and China application No. 201410736624.X, filed Dec. 4, 2014, which are incorporated herein by reference in their entireties. The present disclosure relates to a field of electronic transactions, particularly to an E-wallet transfer payment method and system based on a PKI smart card.

BACKGROUND

The present disclosure relates to the field of electronic transactions, and at present, the PKI smart card transfer is mainly handled via a background account of the back system bound with the PKI smart card. After the PKI smart card transfer, if it wants to promptly notify the user that the transfer transaction is successful, and that the transfer amount has arrived at the user's bank account, it requires the bank of the user's PKI smart card to support real-time transfer, and the user's PKI smart card to turn on a reminder function for the transfer. Moreover, the above transfer transaction process is handled through the third-party trading platform, and cannot be real-time offline transferred.

SUMMARY

The present disclosure is aimed at implementing a rapid, convenient transfer payment between the PKI smart card accounts of users via terminal devices of the users without a third party transaction platform, or implementing a transfer payment directly through the PKI smart card of the user.

In the first aspect, the present disclosure provides an E-wallet transfer payment method based on a PKI smart card, and the method comprising:

connecting a first PKI smart card to a second PKI smart card via a wireless interface; wherein, the first PKI smart card comprises account information about a payment account, and the second PKI smart card comprises account information about a payee account; the first PKI smart card is configured with buttons, a first screen and a first smart chip, and the second PKI smart card is configured with buttons, a second screen and a second smart chip;

the first PKI smart card receiving a transfer instruction input by a first user, wherein the transfer instruction comprises a transfer amount to be transferred to the payee account, the transfer instruction is input by the buttons on the first PKI smart card;

the second PKI smart card sending the account information about the payee account to the first PKI smart card;

the first PKI smart card generating transaction information by the first smart chip according to the transfer instruction, and displaying the transaction information to the first user on the first screen, wherein the transaction information comprises the account information about the payee account and the transfer amount;

the first PKI smart card receiving a confirmation instruction input by the first user according to transaction information displayed on the first screen;

the first PKI smart card deducting a corresponding amount in the payment account according to the transfer amount, and generating a signature information by the first smart chip, wherein the signature information comprises the transfer amount;

the first PKI smart card sending the signature information to the second PKI smart card; so that the corresponding amount is added into the payee account according to the signature information when the verification succeeds.

In one of the technical solutions, the first PKI smart card is directly wirelessly connected to the second PKI smart card, the first PKI smart card is configured with a first wireless communication module, and the second PKI smart card is configured with a second wireless communication module, which communicates with the first wireless communication module.

In another one of the second technical solutions, the first PKI smart card is indirectly wirelessly connected to the second PKI smart card, the first PKI smart card is directly wirelessly connected to a first terminal, and the second PKI smart card is directly wirelessly connected to a second terminal, which communicates with the first terminal.

Further, the second PKI smart card sending the account information about the payee account to the first PKI smart card comprises:

the second PKI smart card sending the account information about the payee account to the second terminal;

the second terminal sending the account information about the payee account to the first terminal; and the first terminal sending the account information about the payee account to the first PKI smart card.

Further, the first PKI smart card sending the signature information to the second PKI smart card comprises:

the first PKI smart card sending the signature information to the first terminal;

the first terminal sending the signature information to the second terminal; and the second terminal sending the signature information to the second PKI smart card.

Further the method further comprises, after the second terminal sending the signature information to the second PKI smart card, the second PKI smart card verifying the signature information by the second smart chip; and adding the corresponding amount to the payee account when the verification succeeds.

As one of the way to send the signature information and verify the signature information, the method comprises:

the first PKI smart card sending the signature information to the first terminal;

the first terminal forwarding the signature information to a first server;

the first server verifying the signature information, generating a credit for load instruction information about a second user according to the signature information via the first server, and sending the credit for load instruction information to the first terminal when the verification succeeds;

the first terminal forwarding the received credit for load instruction information to the second terminal;

the second terminal receiving the credit for load instruction information and forwarding the credit for load instruction information to the second PKI smart card; and the second PKI smart card adding the corresponding amount to the payee account according to the credit for load instruction information.

As another way to send the signature information and verify the signature information, the method comprises:

the first PKI smart card sending the signature information to the first terminal;

the first terminal forwarding the signature information to the second terminal;

the second terminal sending the signature information to a second server;

the second server verifying the signature information; and the second server adding the corresponding amount to the payee account according to the signature information when the verification succeeds.

Further, the second PKI smart card generates transaction completion information by the second smart chip, and displays the transaction completion information on the second screen to a second user.

After the corresponding amount is added into the payee account, the owner of the second PKI smart card could withdraw corresponding money from the bank, or perform the transfer payment with others.

In the second aspect, the present disclosure provides an E-wallet transfer payment system based on PKI smart card, and the system comprising: a first PKI smart card and a second PKI smart card which are connected wirelessly; wherein, the first PKI smart card comprises account information about a payment account, and the second PKI smart card comprises account information about a payee account; the first PKI smart card is configured with buttons, a first screen and a first smart chip, and the second PKI smart card is configured with buttons, a second screen and a second smart chip;

the first PKI smart card is used for receiving a transfer instruction input by a first user, wherein the transfer instruction comprises a transfer amount to be transferred to the payee account, and the transfer instruction is input by the buttons on the first PKI smart card;

the second PKI smart card is used for sending the account information about the payee account to the first PKI smart card;

the first PKI smart card is further used for generating transaction information by the first smart chip according to the transfer instruction, and displaying the transaction information to the first user on the first screen, wherein the transaction information comprises the account information about the payee account and the transfer amount;

the first PKI smart card is further used for receiving a confirmation instruction input by the first user according to transaction information displayed on the first screen;

the first PKI smart card is further used for deducting a corresponding amount in the payment account according to the transfer amount, and generating a signature information by the first smart chip, wherein the signature information comprises the transfer amount; and the first PKI smart card is further used for sending the signature information to the second PKI smart card; so that the corresponding amount is added into the payee account according to the signature information when the verification succeeds.

As one of the technical solutions, the first PKI smart card is directly wirelessly connected to the second PKI smart card, the first PKI smart card is configured with a first wireless communication module, and the second PKI smart card is configured with a second wireless communication module, which communicates with the first wireless communication module.

As another of the technical solutions, wherein the first PKI smart card is indirectly wirelessly connected to the second PKI smart card, the first PKI smart card is directly wirelessly connected to a first terminal, and the second PKI smart card is directly wirelessly connected to a second terminal, which communicates with the first terminal.

Further, the second PKI smart card is used for sending the account information about the payee account to the first PKI smart card comprising:

the second PKI smart card sending the account information about the payee account to the second terminal;

the second terminal sending the account information about the payee account to the first terminal; and the first terminal sending the account information about the payee account to the first PKI smart card.

Further, the first PKI smart card is further used for sending the signature information to the second PKI smart card comprising:

the first PKI smart card sending the signature information to the first terminal;

the first terminal sending the signature information to the second terminal; and the second terminal sending the signature information to the second PKI smart card.

Further, after the second terminal sending the signature information to the second PKI smart card, the second PKI smart card verifies the signature information by the second smart chip and add the corresponding amount to the payee account when the verification succeeds.

One way to send the signature information and verify the signature information, comprises:

the first PKI smart card sending the signature information to the first terminal;

the first terminal forwarding the signature information to a first server;

the first server verifying the signature information, generating a credit for load instruction information about a second user according to the signature information via the first server, and sending the credit for load instruction information to the first terminal when the verification succeeds;

the first terminal forwarding the received credit for load instruction information to the second terminal;

the second terminal receiving the credit for load instruction information and forwarding the credit for load instruction information to the second PKI smart card; and the second PKI smart card adding the corresponding amount to the payee account according to the credit for load instruction information.

Another way to send the signature information and verify the signature information, comprises:

the first PKI smart card sending the signature information to the first terminal;

the first terminal forwarding the signature information to the second terminal;

the second terminal sending the signature information to a second server;

the second server verifying the signature information; and the second server adding the corresponding amount to the payee account according to the signature information when the verification succeeds.

Further, the second PKI smart card is further used for generating transaction completion information by the second smart chip, and displaying the transaction completion information on the second screen to a second user.

After the corresponding amount is added into the payee account, the owner of the second PKI smart card could withdraw corresponding money from the bank, or perform the transfer payment with others.

The E-wallet transfer payment method and system based on the PKI smart card provided by the present disclosure, does not need the support of a third party payment platform, and can implement a transfer transaction between a PKI smart card account of a user and other PKI smart card account directly via a terminal device of the user, or implement a transfer transaction directly between the PKI smart card accounts, which results in a more convenient and rapid transaction.

BRIEF DESCRIPTION

DETAILED DESCRIPTION

In the following, the technical scheme of the present disclosure is further described in detail in reference to the accompanying drawings and embodiments.

Figure 1:
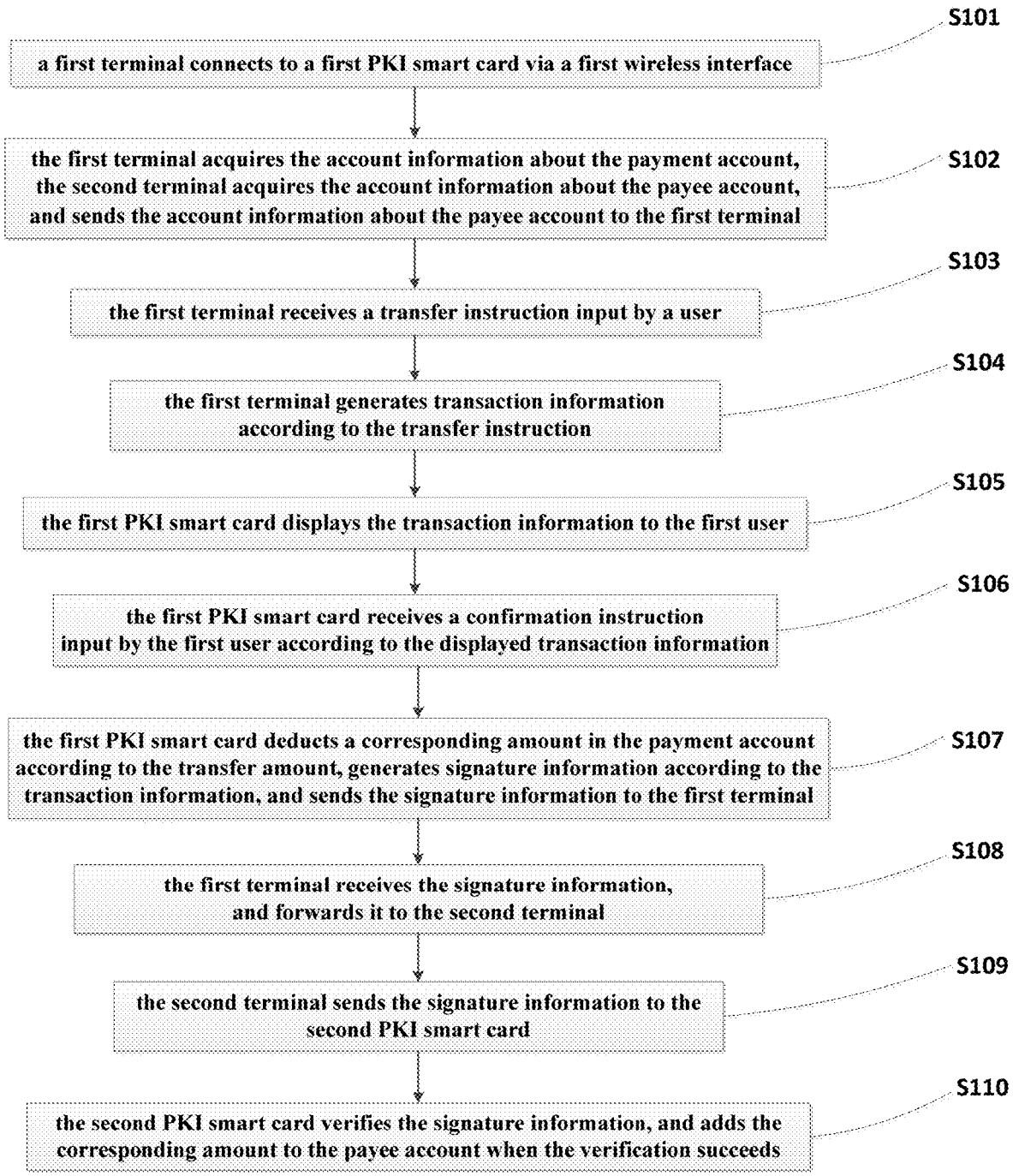
FIG. 1 is a flow chart of an E-wallet transfer payment method provided by Embodiment 1 of the present disclosure.

FIG. 1 is a flow chart of an E-wallet transfer payment method provided by an embodiment of the present disclosure, as shown in FIG. 1, at the situation with a long distance between two PKI smart cards, this embodiment of the present disclosure comprises the following steps: In Step 101, a first terminal connects to a first PKI smart card via a first wireless interface; a second terminal connects to a second PKI smart card via a second wireless interface;

Specifically, the first wireless interface may be a Bluetooth interface or a Near Field Communication (NFC) interface, and the second interface may be a Bluetooth interface or a NFC interface.

The first PKI smart card and the second PKI smart card are the carriers of E-wallet in a transaction. In this embodiment, the first PKI smart card comprises account information about a payment account, and the second terminal comprises account information about a payee account.

Figure 6:
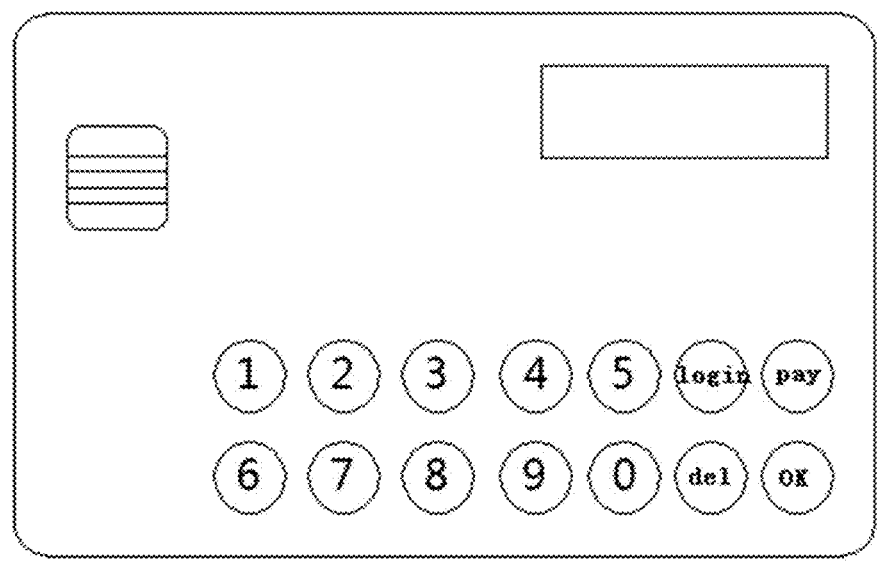
FIG. 6 is front view of a first PKI smart card or a second PKI smart card with buttons and screen.

The first PKI smart card or the second PKI smart card is designed as shown in FIG. 6, the first PKI smart card is configured with buttons and a first screen, and the second PKI smart card is configured with buttons and a second screen. The first PKI smart card and the second PKI smart card are physical entity cards.

Figure 5:
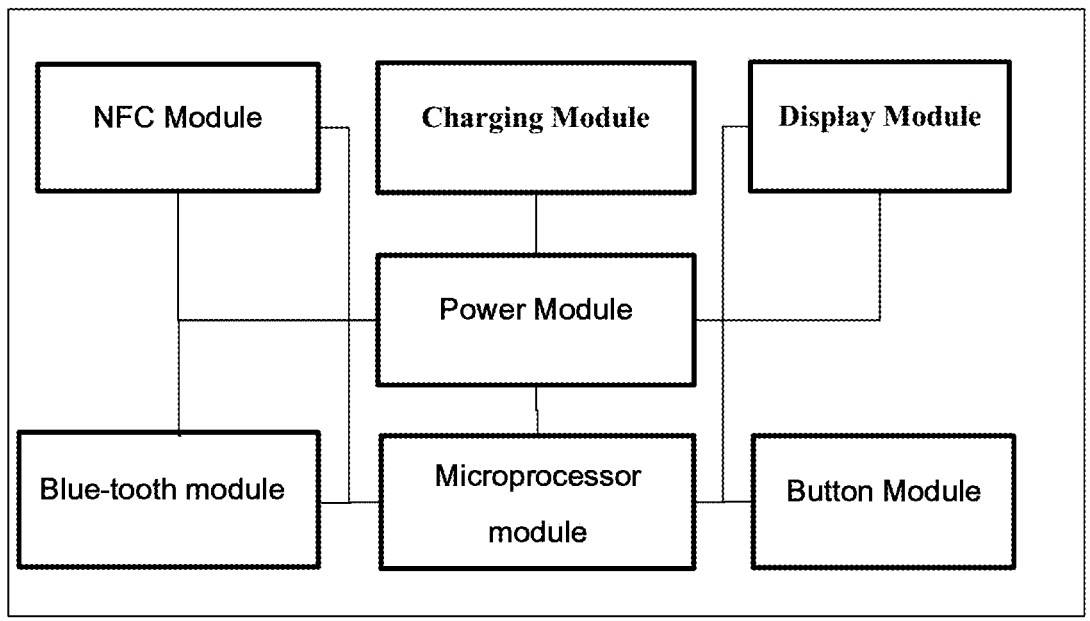
FIG. 5 is a schematic diagram of a first PKI smart card or a second PKI smart card.

The modules of the first PKI smart card or the second PKI smart card are shown in FIG. 5, both of the cards are configured with a display module, a button module, a NFC module, a low power consumption blue-tooth module, a power supply module, a charging module and a microprocessor module. The display module is used for displaying the transaction information; the button module is used for inputting the transfer amount and confirming the transfer amount or the information such as password; the NFC module is used for communicating with general NFC terminal; the low power consumption blue-tooth module is used for communicating with other terminals, such as the communication between the two cards; the power supply module is responsible for providing energy to other components; and the charging module is responsible for adding energy to the power module. The microprocessor module is a smart chip which has at least one public-private key paired with an associated certificate capable of generating digital signatures with the private key whereby the usage of the private key is protected by a PIN code so that the PKI smart card with this microprocessor module (smart chip) can generate or verify signatures. In a specific example, the first terminal connects to the first PKI smart card in a Bluetooth communication manner, and the second terminal connects to the second PKI smart card in a NFC interface communication manner.

The first terminal pages the first PKI smart card in a frequency hopping manner, and the first PKI smart card scans external paging at intervals, and responses to the first terminal when the first terminal (the external paging) is scanned, and then a connection, i.e., Asynchronous Connectionless (ACL) is built between the first terminal and the first PKI smart card.

NFC is applied in short range communication, and thus, the second terminal can connect to the second PKI smart card only in a "touch" manner.

In Step 102, the first terminal acquires the account information about the payment account, the second terminal acquires the account information about the payee account, and sends the account information about the payee account to the first terminal.

Specifically, the first terminal acquires the account information about the payment account stored in the first PKI smart card by means of Bluetooth function, wherein the account information about the payment account may include the name and the account number of the payment account, etc.; the second terminal connects the second PKI smart card by means of NFC, acquires the account information about the payee account stored in the second PKI smart card, wherein the account information about the payee account may include the name and the account number of the payee account, etc., and sends the account information about the payee account to the first terminal.

In Step 103, the first terminal receives a transfer instruction input by a user.

Specifically, the user selects a transfer function in the first terminal, and inputs a transfer instruction, and the first terminal receives the transfer instruction input by the user; wherein, the transfer instruction comprises a transfer amount to be transferred to the payee account.

In Step 104, the first terminal generates transaction information according to the transfer instruction.

Specifically, after the first terminal receiving the transfer instruction, the first terminal generates the transaction information internally according to the account information about the payee account and the transfer account, etc., and sends the transaction information to the first PKI smart card by means of Bluetooth.

In Step 105, the first PKI smart card displays the transaction information to the first user.

In Step 106, the first PKI smart card receives a confirmation instruction input by the first user according to the displayed transaction information.

Specifically, the first PKI smart card displays the transaction information to the first user via a display, the first user confirms the displayed transaction information, and when it is confirmed to be correct, the first user inputs confirmation instruction into the first PKI smart card; and when it is confirmed to be wrong, the transaction is terminated.

In Step 107, the first PKI smart card deducts a corresponding amount in the payment account according to the transfer amount, generates signature information according to the transaction information, and sends the signature information to the first terminal.

Specifically, after the first PKI smart card receiving the confirmation instruction input by the first user, the first PKI smart card deducts an electronic amount corresponding to the transfer amount in the electronic balance of the payment account; the first PKI smart card generates transaction record, and at the same time, generates signature information according to the transaction information, and sends the signature information to the first terminal.

In Step 108, the first terminal receives the signature information, and forwards it to the second terminal.

Specifically, the first terminal connects to the second terminal by means of Bluetooth pairing, and sends the signature information to the second terminal by means of Bluetooth after receiving the signature information sent by the first PKI smart card.

Moreover, in a specific example, after the first PKI smart card deducting the corresponding amount in the payment account according to the transfer amount, and generating the signature information according to the transaction information and sending the signature information to the first terminal, the first terminal connects to a first server by means of communication network and forwards the signature information to the first server, and the first server is a server of the background electronic account of the payment account. The first server verifies the signature information, wherein, the signature information is a digital signature based on Public Key Infrastructure (PKI), and the first server may verify the signature information according to the internally stored digital certificate; or, when the signature information is a dynamic signature, the first server compares the signature information with the internally stored dynamic signature, and the verification succeeds when the signature information is the same with the internally stored dynamic signature, and if not, the verification fails.

When the verification fails, the transaction terminates, and verification failure information is returned to the first terminal; when the verification succeeds, the first server sends the verification success information to the first terminal, and at the same time, the first PKI smart card generates credit for load instruction information according to the signature information, and sends the credit for load instruction information to the first terminal, the first terminal forwards the received credit for load instruction information to the second terminal, the second terminal forwards the received credit for load instruction information to the second PKI smart card, and the second PKI smart card adds the corresponding amount to the payee account according to the credit for load instruction information. The second PKI smart card returns transaction completion information to the second terminal.

In another specific example, after the first PKI smart card deducting the corresponding amount in the payment account according to the transfer amount, and generating the signature information according to the transaction information and sending the signature information to the first terminal, the first terminal connects to a first server by means of communication network and forwards the signature information to the first server, the first server verifies the signature information, the signature information also can be a PKI based digital signature, or a dynamic signature, and the process of the signature verification is similar to the above-mentioned verification process of the signature information, and is not repeated here. When the verification fails, verification failure information is returned to the first terminal; when the verification succeeds, the first server transfers the corresponding electronic amount to the payee account according to the transaction amount in the signature information; further, the first server sends verification success or failure information to the first terminal, the first terminal forwards the verification success or failure information to the second terminal, the second terminal forwards it to the second PKI smart card, and the second PKI smart card verifies the verification success or failure information and forwards the verification result to the second terminal.

In Step 109, the second terminal sends the signature information to the second PKI smart card.

Specifically, the second terminal connects to the second PKI smart card by means of NFC, and sends the signature information to the second PKI smart card by means of NFC.

Moreover, in a specific example, after the first terminal receives the signature information sent by the first PKI smart card and forwards it to the second terminal, the second terminal also connects to a second server by means of communication network and forwards the signature information to the second server; the second server is a server of the background electronic cash account of the payee account. The second server verifies the signature information, wherein, the signature information also can be a PKI based digital signature, or a dynamic signature, and the process of the signature verification is similar to the above-mentioned verification process of the signature information in Step 108, and is not repeated here.

When the verification succeeds, the corresponding electronic amount is added to the electronic cash balance of the payee account according to the transfer amount in the signature information, and the transaction completion information is returned to the second terminal. When the verification fails, the transaction terminates, and the transaction failure information is sent to the second terminal.

In Step 110, the second PKI smart card verifies the signature information, and adds the corresponding amount to the payee account when the verification succeeds.

In a specific example, the signature information also can be a PKI based digital signature, or a dynamic signature, and the process of the signature verification is similar to the above-mentioned verification process of the signature information in Step 108, and is not repeated here.

When the verification succeeds, the second PKI smart card adds the corresponding amount to the electronic cash balance of the payee account according to the signature information, and the second PKI smart card generates the transaction record. At the same time, the second PKI smart card generates transaction completion information, and sends the transaction completion information to the second terminal to display the transaction completion information to a second user; when the verification fails, the transaction terminates, and transaction failure information is sent to the second terminal, to display it to the second user by the second terminal.

The E-wallet transfer payment method provided by the present embodiment, can implement a transfer transaction between a PKI smart card account of a user and other PKI smart card account via terminal devices of the users, not by means of a third party payment platform, which enables a more convenient and rapid transaction; in addition, the PKI smart card itself has a display function, and the user can timely know the transaction success or failure condition in the case that the PKI smart card of the user does not turn on the arrival reminder function.

After the corresponding amount is added into the payee account, the owner of the second PKI smart card could withdraw corresponding money from the bank, or perform the transfer payment with others.

Figure 2:
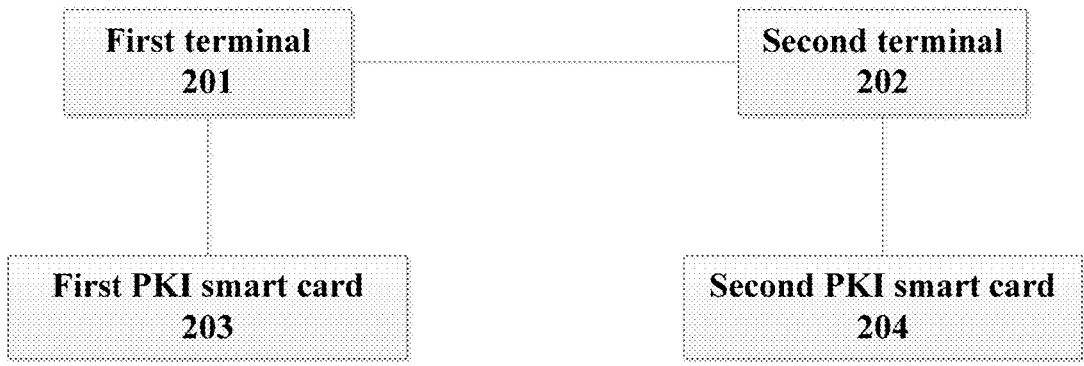
FIG. 2 is a schematic diagram of an E-wallet transfer payment system provided by Embodiment 2 of the present disclosure.

FIG. 2 is a schematic diagram of an E-wallet transfer payment system provided by an embodiment of the present disclosure, and the system comprises: a first terminal 201, a second terminal 202, a first PKI smart card 203, and a second PKI smart card 204.

Specifically, the first terminal 201 connects to the first PKI smart card 203 via a first wireless interface, wherein, the first PKI smart card 203 comprises account information about a payment account, and, the first terminal 201 acquires the account information about the payment account.

The second terminal 202 connects to the second PKI smart card 204 via a second wireless interface, wherein, the second PKI smart card 204 comprises account information about a payee account, and, the second terminal 204 acquires the account information about the payee account. Further, the second terminal 204 sends the account information about the payee account to the first terminal 201.

The first terminal 201 receives a transfer instruction input by a user, wherein the transfer instruction comprises a transfer amount to be transferred to the payee account; the first terminal 201 generates transaction information according to the transfer instruction and sends the transaction information to the first PKI smart card 203, wherein the transaction information comprises the account information about the payee account and the transfer amount.

The first PKI smart card 203 displays the transaction information to the first user, and receives a confirmation instruction input by the first user according to the displayed transaction information; the first PKI smart card 203 deducts a corresponding amount in the payment account according to the transfer amount, and generates transaction record; at the same time, the first PKI smart card 203 generates a signature information according to the transaction information and sends the signature information to the first terminal 201.

The first terminal 201 receives the signature information, and forwards it to the second terminal 202.

In a specific embodiment, the first terminal 201 may be a terminal device, such as a mobile phone, a tablet computer, or a desktop computer, etc.

The second terminal 202 may be a terminal device, such as a mobile phone, a tablet computer, or a desktop computer, etc.

The first PKI smart card 203 may be a smart financial card with display function and key operation, and the like, generally, the account holder of the first PKI smart card 203 is the holder of the first terminal 201, i.e. the first user.

The second PKI smart card 204 may be a smart financial card with display function and key operation, and the like, generally, the account holder of the second PKI smart card 204 is the holder of the second terminal 201, i.e. the second user.

Optionally, the system further comprises a first server, and in a specific example, after the first PKI smart card 203 deducting the corresponding amount in the payment account according to the transfer amount, generating the signature information according to the transaction information, and sending the signature information to the first terminal 201, the first terminal 201 receives the signature information and forwards it to the first server. The first server receives the signature information forwarded by the first terminal 201, and verifies the signature information, wherein, the signature information is a digital signature based on Public Key Infrastructure (PKI), and the first server may verify the signature information according to the internally stored digital certificate; or, when the signature information is a dynamic signature, the first server compares the signature information with the internally stored dynamic signature, and the verification succeeds when the signature information is the same with the internally stored dynamic signature, and if not, the verification fails.

When the verification fails, the transaction terminates, and verification failure information is returned to the first terminal 201; when the verification succeeds, the first server sends the verification success information to the first terminal 201, and at the same time, generates credit for load instruction information according to the signature information, and sends the credit for load instruction information to the first terminal 201, the first terminal 201 further forwards the received credit for load instruction information to the second terminal 202, the second terminal 202 further receives the credit for load instruction information and forwards it to the second PKI smart card 204, and the second PKI smart card 204 further adds the corresponding amount to the payee account according to the credit for load instruction information, and returns transaction completion information to the second terminal 202.

In another specific example, after the first PKI smart card 203 deducting the corresponding amount in the payment account according to the transfer amount, generating the signature information according to the transaction information, and sending the signature information to the first terminal 201, the first terminal 201 connects to a first server by means of communication network and forwards the signature information to the first server, the first server verifies the signature information, the signature information also can be a PKI based digital signature, or a dynamic signature, and the process of the signature verification is similar to the above-mentioned verification process of the signature information, and is not repeated here. When the verification fails, verification failure information is returned to the first terminal 201; when the verification succeeds, the first server transfers the corresponding electronic amount to the payee account according to the transaction amount in the signature information; further, the first server sends verification success information to the first terminal 201. The first terminal 201 forwards the verification success or failure information to the second terminal 202, the second terminal 202 forwards it to the second PKI smart card 204, and the second PKI smart card 204 checks the verification success or failure information and forwards the checking result to the second terminal 202.

The second terminal 202 sends the signature information to the second PKI smart card 204.

Optionally, in a specific example, the system further comprises a second server, and the second terminal 202 also connects to the second server by means of communication network; and after the first terminal 201 receiving the signature information sent by the first PKI smart card 203 and forwarding it to the second terminal 202, the second terminal 202 forwards the signature information to the second server, and the second server is a server of the background electronic cash account of the payee account. The second server verifies the signature information, wherein, the signature information also can be a PKI based digital signature, or a dynamic signature, and the process of the signature verification is similar to the above-mentioned verification process of the signature information, and is not repeated here.

When the verification succeeds, the corresponding amount is added to the payee account according to the signature information, and the transaction completion information is returned to the second terminal; when the verification fails, the transaction terminates, and the transaction failure information is sent to the second terminal.

The second PKI smart card 204 verifies the signature information, and the signature information is a PKI based digital signature, or a dynamic signature, and the specific verification process is similar to the above-mentioned verification process of the signature information, and is not repeated here. When the verification succeeds, the second PKI smart card 204 adds the corresponding electronic amount to the electronic cash balance of the payee account according to the signature information, and the second PKI smart card 204 generates the transaction record, and generates the transaction completion information at the same time. The second PKI smart card 204 sends the transaction completion information to the second terminal 202 to display the transaction completion information to a second user by the second terminal 202; when the verification fails, the transaction terminates, and transaction failure information is sent to the second terminal 202, to display it to the second user by the second terminal 202.

The E-wallet transfer payment system provided by the present embodiment, does not need the support of a third party payment platform, and can implement a transfer transaction between a PKI smart card account of a user and other PKI smart card account directly via terminal devices of the users, which enables a more convenient and rapid transaction. In addition, the PKI smart card itself has a display function, and the user can timely know the transaction success or failure condition in the case that the PKI smart card of the user does not turn on the arrival reminder function.

Figure 3:
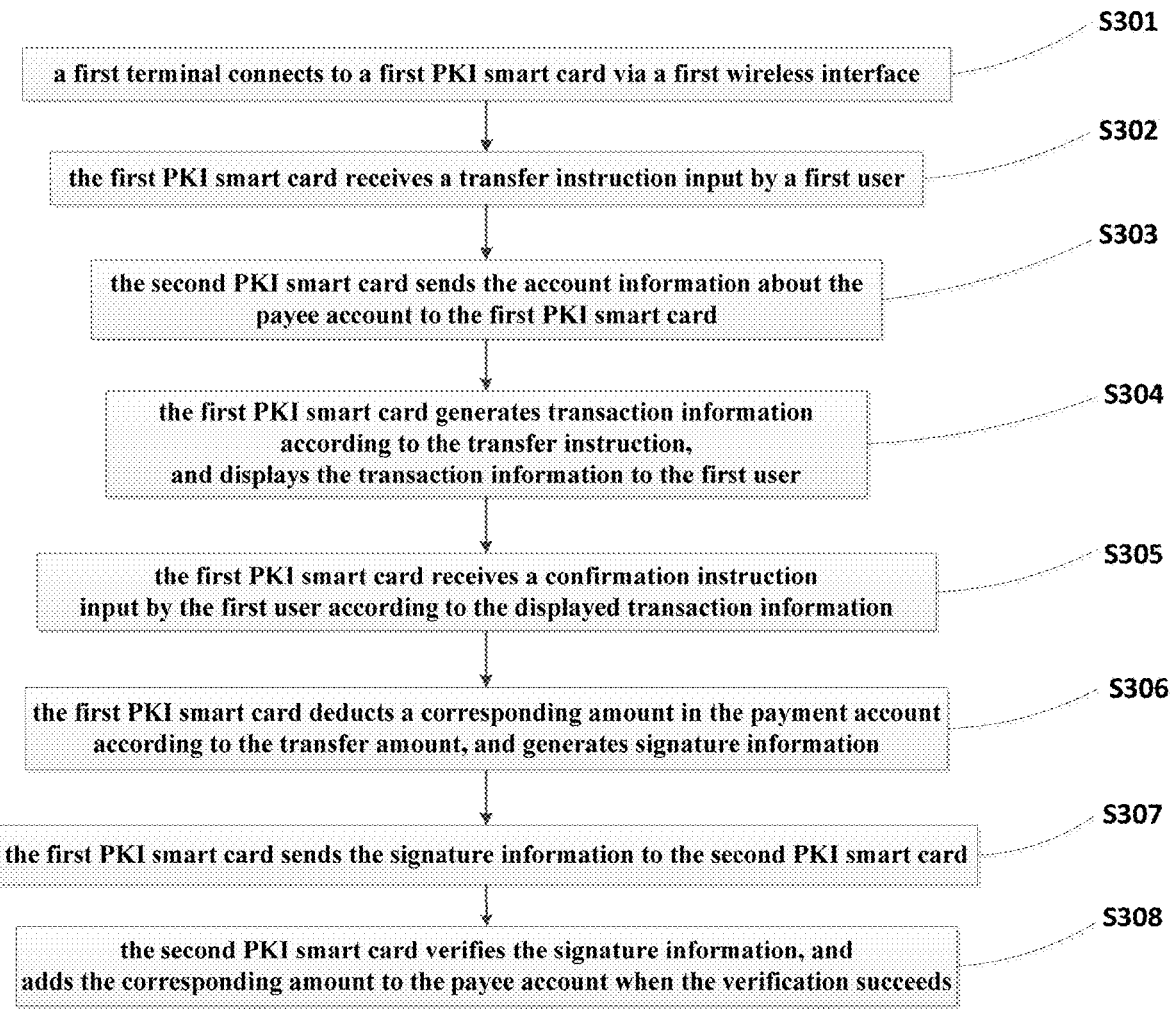
FIG. 3 is a flow chart of another E-wallet transfer payment method provided by Embodiment 3 of the present disclosure.

FIG. 3 is a flow chart of another E-wallet transfer payment method provided by an embodiment of the present disclosure, as shown in FIG. 3, at the situation with a short distance between two PKI smart cards, this embodiment of the present disclosure comprises the following steps:

In Step 301, a first PKI smart card connects to a second PKI smart card via a wireless interface.

In a specific example, the first PKI smart card connects to the second PKI smart card connects via a wireless interface in a Bluetooth communication manner; specifically, the first PKI smart card pages the second PKI smart card in a frequency hopping manner, and the second PKI smart card scans external paging at intervals, and responses to the first PKI smart card when the first PKI smart card (the external paging) is scanned, and then a connection, i.e., Asynchronous Connectionless (ACL) is built between the first PKI smart card and the second PKI smart card; wherein, the first PKI smart card comprises account information about a payment account, and the second PKI smart card comprises account information about a payee account; moreover, the account information about the payment account may include the name and the account number of the payment account, etc., and the account information about the payee account may include the name and the account number of the payee account, etc.

The first PKI smart card or the second PKI smart card is designed as shown in FIG. 6, the first PKI smart card is configured with buttons and a first screen, and the second PKI smart card is configured with buttons and a second screen. The first PKI smart card and the second PKI smart card are physical entity cards.

The modules of the first PKI smart card or the second PKI smart card are shown in FIG. 5, both of the cards are configured with a display module, a button module, a NFC module, a low power consumption blue-tooth module, a power supply module, a charging module and a microprocessor module. The display module is used for displaying the transaction information; the button module is used for inputting the transfer amount and confirming the transfer amount or the information such as password; the NFC module is used for communicating with general NFC terminal; the low power consumption blue-tooth module is used for communicating with other terminals, such as the communication between the two cards; the power supply module is responsible for providing energy to other components; and the charging module is responsible for adding energy to the power module. The microprocessor module is a smart chip which has at least one public-private key paired with an associated certificate capable of generating digital signatures with the private key whereby the usage of the private key is protected by a PIN code so that the PKI smart card with this microprocessor module (smart chip) can generate or verify signatures.

In Step 302, the first PKI smart card receives a transfer instruction input by a first user. Specifically, the first user selects a transfer function in the first PKI smart card, and inputs a transfer instruction, and the first PKI smart card receives the transfer instruction input by the first user, wherein, the transfer instruction comprises a transfer amount to be transferred to the payee account.

In Step 303, the second PKI smart card sends the account information about the payee account to the first PKI smart card.

Specifically, the second PKI smart card sends the account information about the payee account internally stored to the first PKI smart card by means of Bluetooth communication.

In Step 304, the first PKI smart card generates transaction information according to the transfer instruction, and displays the transaction information to the first user.

After receiving the transfer instruction, the first PKI smart card internally generates the transaction information according to the account information about the payee account and the transfer account, etc., and displays the transaction information, so that the first user can check the exactitude of the transaction information.

In Step 305, the first PKI smart card receives a confirmation instruction input by the first user according to the displayed transaction information.

Specifically, the first user confirms the displayed transaction information, and when it is confirmed to be correct, the first user inputs confirmation information into the first PKI smart card, and the first PKI smart card verifies the transaction information according to the received confirmation instruction; and when it is confirmed to be wrong, the transaction is terminated.

In Step 306, the first PKI smart card deducts a corresponding amount in the payment account according to the transfer amount, and generates signature information.

Specifically, the first PKI smart card deducts an electronic amount corresponding to the transfer amount in the electronic balance of the payment account; the first PKI smart card generates transaction record, and at the same time, generates signature information, wherein, the signature information comprises the transfer amount.

In Step 307, the first PKI smart card sends the signature information to the second PKI smart card.

Specifically, the first PKI smart card sends the signature information to the second PKI smart card by means of Bluetooth communication.

In Step 308, the second PKI smart card verifies the signature information, and adds the corresponding amount to the payee account.

Specifically, the second PKI smart card acquires the transfer amount from the signature information, and then adds the corresponding amount to the electronic cash balance of the payee account, and the second PKI smart card generates the transaction record. At the same time, the second PKI smart card generates transaction completion information and displays the transaction completion information to a second user. Wherein, the signature information includes the transfer amount.

After the corresponding amount is added into the payee account, the owner of the second PKI smart card could withdraw corresponding money from the bank, or perform the transfer payment with others.

The E-wallet transfer payment method provided by the present embodiment, can implement a transfer between a PKI smart card and other PKI smart card, not by means of a third party payment platform, which enables a more convenient and rapid transaction; in addition, the PKI smart card itself has a display function, and the user can timely know the transaction success or failure condition in the case that the PKI smart card of the user does not turn on the arrival reminder function.

Figure 4:
FIG. 4 is a schematic diagram of another E-wallet transfer payment system provided by Embodiment 4 of the present disclosure.

FIG. 4 is a schematic diagram of another E-wallet transfer payment system provided by an embodiment of the present disclosure, and the system comprises: a first PKI smart card 401 and a second PKI smart card 402.

Specifically, a first PKI smart card 401 connects to a second PKI smart card 402 by means of a wireless interface in Bluetooth communication manner; wherein, the first PKI smart card comprises account information about a payment account, and the second PKI smart card comprises account information about a payee account.

The first user selects the transfer function on the first PKI smart card, and inputs a transfer instruction, and the second PKI smart card 402 sends the account information about the payee account to the first PKI smart card. The first PKI smart card 401 receives the transfer instruction, wherein the transfer instruction comprises a transfer amount to be transferred to the payee account. After receiving the transfer instruction, the first PKI smart card 401 internally generates transaction information according to the account information about the payee account and the transfer amount, etc., and the first PKI smart card 401 displays the transaction information, and the first user confirms the displayed transaction information, and when it is confirmed to be correct, the first user inputs confirmation instruction into the first PKI smart card 401, and the first PKI smart card 401 verifies the transaction information according to the received confirmation instruction; and when it is confirmed to be wrong, the transaction is terminated. The first PKI smart card 401 sends the signature information to the second PKI smart card 402, and the second PKI smart card 204 acquires the transfer amount from the signature information sent by the first PKI smart card, adds the corresponding amount to the electronic balance of the payee account, and internally generates the transaction record, and at the same time, generates the transaction completion information to display it to a second user. Wherein, the signature information includes the transfer amount.

In a specific embodiment, the first PKI smart card 401 may be a smart financial card with display function and key operation, and the like; and the second PKI smart card 402 may also be a smart financial card with display function and key operation, and the like.

The E-wallet transfer payment system provided by the present embodiment, does not need the support of a third party payment platform, and can implement a transfer transaction directly between a PKI smart card and other PKI smart card, which enables a more convenient and rapid transaction. In addition, the PKI smart card itself has a display function, and the user can timely know the transaction success or failure condition in the case that the PKI smart card of the user does not turn on the arrival reminder function.

The skilled person should also be further aware that the elements and algorithm steps of the various examples described in connection with the embodiments disclosed herein can be implemented in electronic hardware, computer software, or a combination thereof, in order to clearly illustrate the hardware and software interchangeability, the constitution and steps of each example have been generally described in terms of functionality in the above description. Whether these functions are implemented in hardware or software, depends on the specific application and design constraints of the technical solution. The skilled technician may use different methods to implement the described functions for each particular application, but such implementations should not be considered to be beyond the scope of the present disclosure.

The steps of a method or algorithms described in combination with the embodiments disclosed herein may be implemented with hardware, a software module executed by a processor, or a combination thereof. The software modules may be placed in random access memory (RAM), memory, read only memory (ROM), electrically programmable ROM, electrically erasable programmable ROM, registers, hard disks, removable disks, CD-ROM, or any other form of storage medium well known in the art.

The above-mentioned specific embodiments further detailed illustrate the purposes, technical schemes and advantages of the present disclosure, and it should be understood that the above are only specific implementations of the present disclosure, and are not to limit the protection scope of the present disclosure. Any modification, substitution to same object, improvement and the like made within the spirit and principle of the present disclosure, should be included in the protection scope of the present disclosure.

The invention claimed is:

1. An e-wallet transfer payment method based on a public key infrastructure (PKI) smart card, the method comprising:
　wirelessly connecting a first PKI smart card to a second PKI smart card via a wireless interface; wherein, the first PKI smart card comprises account information about a payment account, and the second PKI smart card comprises account information about a payee account; the first PKI smart card is configured with buttons, a first screen and a first smart chip, and the second PKI smart card is configured with buttons, a second screen and a second smart chip;
　the first PKI smart card receiving a transfer instruction for a financial transaction input by a first user, wherein the transfer instruction comprises a transfer amount to be transferred to the payee account, the transfer instruction is input by the buttons on the first PKI smart card;
　the second PKI smart card sending the account information about the payee account to the first PKI smart card;
　the first PKI smart card generating transaction information by the first smart chip according to the transfer instruction, and displaying the transaction information to the first user on the first screen, wherein the transaction information comprises the account information about the payee account and the transfer amount;

the first PKI smart card receiving a confirmation instruction input by the first user according to transaction information displayed on the first screen;

the first PKI smart card deducting a corresponding amount in the payment account according to the transfer amount, and generating a signature information which includes a digital signature based on PKI, by the first smart chip, wherein the signature information comprises the transfer amount; and the first PKI smart card sending the signature information to the second PKI smart card so that the corresponding amount is added into the payee account according to the signature information when the signature information for the financial transaction is verified according to a stored digital certificate.

2. The method according to claim 1, wherein the first PKI smart card is directly wirelessly connected to the second PKI smart card, the first PKI smart card is configured with a first wireless communication module, and the second PKI smart card is configured with a second wireless communication module, which communicates with the first wireless communication module.

3. The method according to claim 1, wherein the first PKI smart card is indirectly wirelessly connected to the second PKI smart card, the first PKI smart card is directly wirelessly connected to a first terminal, and the second PKI smart card is directly wirelessly connected to a second terminal, which communicates with the first terminal.

4. The method according to claim 3, wherein the second PKI smart card sending the account information about the payee account to the first PKI smart card comprising:

the second PKI smart card sending the account information about the payee account to the second terminal;

the second terminal sending the account information about the payee account to the first terminal; and the first terminal sending the account information about the payee account to the first PKI smart card.

5. The method according to claim 3, wherein the first PKI smart card sending the signature information to the second PKI smart card comprising:

the first PKI smart card sending the signature information to the first terminal;

the first terminal sending the signature information to the second terminal; and the second terminal sending the signature information to the second PKI smart card.

6. The method according to claim 5, after the second terminal sending the signature information to the second PKI smart card, further comprising:

the second PKI smart card verifying the signature information by the second smart chip; and adding the corresponding amount to the payee account when the verification succeeds.

7. The method according to claim 3, wherein the first PKI smart card sending the signature information to the second PKI smart card and the corresponding amount is added into the payee account according to the signature information comprises:

the first PKI smart card sending the signature information to the first terminal;

the first terminal forwarding the signature information to a first server;

the first server verifying the signature information, generating a credit for load instruction information about a second user of the second PKI smart card according to the signature information via the first server, and sending the credit for load instruction information to the first terminal when the verification succeeds;

the first terminal forwarding the received credit for load instruction information to the second terminal;

the second terminal receiving the credit for load instruction information and forwarding the credit for load instruction information to the second PKI smart card; and the second PKI smart card adding the corresponding amount to the payee account according to the credit for load instruction information.

8. The method according to claim 3, wherein the first PKI smart card sending the signature information to the second PKI smart card and the corresponding amount is added into the payee account according to the signature information comprises:

the first PKI smart card sending the signature information to the first terminal;

the first terminal forwarding the signature information to the second terminal;

the second terminal sending the signature information to a second server;

the second server verifying the signature information; and the second server adding the corresponding amount to the payee account according to the signature information when the verification succeeds.

9. The method according to claim 5, further comprising: the second PKI smart card generating transaction completion information by the second smart chip, and displaying the transaction completion information on the second screen to a second user of the second PKI smart card.

10. The method according to claim 1, wherein after the corresponding amount is added into the payee account, a second user of the second PKI smart card withdraws corresponding money from the bank, or performs the transfer payment with others.

11. An e-wallet transfer payment system based on a public key infrastructure (PKI) smart card, the system comprising:

a first PKI smart card and a second PKI smart card which are connected wirelessly;

wherein, the first PKI smart card comprises account information about a payment account, and the second PKI smart card comprises account information about a payee account; the first PKI smart card is configured with buttons, a first screen and a first smart chip, and the second PKI smart card is configured with buttons, a second screen and a second smart chip;

the first PKI smart card is configured for receiving a transfer instruction for a financial transaction input by a first user, wherein the transfer instruction comprises a transfer amount to be transferred to the payee account, and the transfer instruction is input by the buttons on the first PKI smart card;

the second PKI smart card is configured for sending the account information about the payee account to the first PKI smart card;

the first PKI smart card is further configured for generating transaction information by the first smart chip according to the transfer instruction, and displaying the transaction information to the first user on the first screen, wherein the transaction information comprises the account information about the payee account and the transfer amount;

the first PKI smart card is further configured for receiving a confirmation instruction input by the first user according to transaction information displayed on the first screen;

the first PKI smart card is further configured for deducting a corresponding amount in the payment account according to the transfer amount, and generating a signature information which includes a digital signature based on PKI, by the first smart chip, wherein the signature information comprises the transfer amount; and the first PKI smart card is further configured for sending the signature information to the second PKI smart card, wherein the corresponding amount is added into the payee account according to the signature information when the signature information for the financial transaction is verified according to a stored digital certificate.

12. The system according to claim 11, wherein the first PKI smart card is directly wirelessly connected to the second PKI smart card, the first PKI smart card is configured with a first wireless communication module, and the second PKI smart card is configured with a second wireless communication module, which communicates with the first wireless communication module.

13. The system according to claim 11, wherein the first PKI smart card is indirectly wirelessly connected to the second PKI smart card, the first PKI smart card is directly wirelessly connected to a first terminal, and the second PKI smart card is directly wirelessly connected to a second terminal, which communicates with the first terminal.

14. The system according to claim 13, wherein the second PKI smart card is configured for sending the account information about the payee account to the first PKI smart card, comprising:
the second PKI smart card sending the account information about the payee account to the second terminal;
the second terminal sending the account information about the payee account to the first terminal; and
the first terminal sending the account information about the payee account to the first PKI smart card.

15. The system according to claim 13, wherein the first PKI smart card is further configured for sending the signature information to the second PKI smart card, comprising:
the first PKI smart card sending the signature information to the first terminal;
the first terminal sending the signature information to the second terminal; and
the second terminal sending the signature information to the second PKI smart card.

16. The system according to claim 15, wherein after the second terminal sending the signature information to the second PKI smart card,
the second PKI smart card is configured to verify the signature information by the second smart chip and add the corresponding amount to the payee account when the verification succeeds.

17. The system according to claim 13, wherein the first PKI smart card sending the signature information to the second PKI smart card and the corresponding amount is added into the payee account according to the signature information comprising:
the first PKI smart card sending the signature information to the first terminal;
the first terminal forwarding the signature information to a first server;
the first server verifying the signature information, generating a credit for load instruction information about a second user of the second PKI smart card according to the signature information via the first server, and sending the credit for load instruction information to the first terminal when the verification succeeds;
the first terminal forwarding the received credit for load instruction information to the second terminal;
the second terminal receiving the credit for load instruction information and forwarding the credit for load instruction information to the second PKI smart card; and
the second PKI smart card adding the corresponding amount to the payee account according to the credit for load instruction information.

18. The system according to claim 13, wherein the first PKI smart card sending the signature information to the second PKI smart card and the corresponding amount is added into the payee account according to the signature information comprising:
the first PKI smart card sending the signature information to the first terminal;
the first terminal forwarding the signature information to the second terminal;
the second terminal sending the signature information to a second server;
the second server verifying the signature information; and
the second server adding the corresponding amount to the payee account according to the signature information when the verification succeeds.

19. The system according to claim 15, wherein the second PKI smart card is further configured for generating transaction completion information by the second smart chip, and displaying the transaction completion information on the second screen to a second user of the second PKI smart card.

20. The system according to claim 11, wherein after the corresponding amount is added into the payee account, the second PKI smart card is configured to allow a second user of the second PKI smart card to withdraw corresponding money from the bank, or perform the transfer payment with others.

* * * * *